(12) United States Patent
Vaughn et al.

(10) Patent No.: US 9,972,131 B2
(45) Date of Patent: May 15, 2018

(54) PROJECTING A VIRTUAL IMAGE AT A PHYSICAL SURFACE

(71) Applicant: Intel Corporation, Santa Clara, CA (US)

(72) Inventors: Robert L. Vaughn, Albuquerque, NM (US); Daniel C. Middleton, Independence, MN (US); Charles Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 14/294,709

(22) Filed: Jun. 3, 2014

(65) Prior Publication Data
US 2015/0348324 A1 Dec. 3, 2015

(51) Int. Cl.
*G09G 5/00* (2006.01)
*G06T 19/00* (2011.01)
*G06T 7/246* (2017.01)

(52) U.S. Cl.
CPC ............ *G06T 19/006* (2013.01); *G06T 7/246* (2017.01); *G06T 19/003* (2013.01); *G06T 2200/24* (2013.01); *G06T 2207/10016* (2013.01)

(58) Field of Classification Search
CPC .............................. G06T 19/006; G06T 19/00
USPC ......................................................... 345/633
See application file for complete search history.

(56) References Cited

U.S. PATENT DOCUMENTS

| 5,988,817 | A  | * | 11/1999 | Mizushima | ............. | G09F 19/18 352/133 |
| 9,009,516 | B1 | * | 4/2015  | Gabayan et al. | ............. | 713/323 |
| 2003/0062675 | A1 | * | 4/2003 | Noro et al. | .................... | 273/237 |
| 2007/0205980 | A1 | * | 9/2007 | Dijk | .............................. | 345/156 |
| 2010/0014056 | A1 | * | 1/2010 | Mitsuhashi et al. | ............ | 353/69 |
| 2010/0031201 | A1 | * | 2/2010 | de Haan | ....................... | 715/863 |
| 2010/0315418 | A1 |   | 12/2010 | Woo | | |
| 2012/0017147 | A1 | * | 1/2012 | Mark | ............................. | 715/702 |
| 2012/0026376 | A1 | * | 2/2012 | Goran | ........................ | 348/333.1 |
| 2012/0139914 | A1 |   | 6/2012 | Jeon | | |
| 2012/0166993 | A1 | * | 6/2012 | Anderson et al. | ............ | 715/771 |
| 2012/0249590 | A1 |   | 10/2012 | Maciocci et al. | | |
| 2012/0269388 | A1 | * | 10/2012 | Jiang et al. | .................... | 382/103 |
| 2013/0222427 | A1 |   | 8/2013 | Heo et al. | | |
| 2013/0229396 | A1 | * | 9/2013 | Huebner | ....................... | 345/207 |
| 2014/0104171 | A1 | * | 4/2014 | Delfs et al. | ................... | 345/158 |
| 2014/0191947 | A1 | * | 7/2014 | Sharma | ......................... | 345/156 |
| 2014/0248950 | A1 | * | 9/2014 | Tosas Bautista | ................ | 463/31 |

FOREIGN PATENT DOCUMENTS

KR          20090000777 A       1/2009

OTHER PUBLICATIONS

International Search Report for PCT Application No. PCT/US2015/030221, dated Aug. 10, 2015, 3 pages.

* cited by examiner

*Primary Examiner* — Jin Ge
(74) *Attorney, Agent, or Firm* — International IP Law Group, P.L.L.C.

(57) ABSTRACT

Techniques for projecting virtual images are described herein. A plane of a surface may be identified, and a virtual image is projected onto the plane of the physical surface. The virtual image is rendered at a graphical user interface of a mobile computing device.

18 Claims, 11 Drawing Sheets

300

400

500

800

900

1000

PROJECTING A VIRTUAL IMAGE AT A PHYSICAL SURFACE

TECHNICAL FIELD

This disclosure relates generally to virtual image projection. More specifically, the disclosure describes projection of a virtual image to a plane of a physical surface.

BACKGROUND

Mobile computing devices are becoming more common place in the market. In some scenarios, mobile computing devices are useful in augmented reality environments. In augmented reality environments, virtual objects are represented as objects in a physical environment via a graphical user interface of the mobile computing devices. For example, a camera of a mobile computing device may be used to capture elements within a physical environment and modify a representation of the physical environment with virtual images rendered at a graphical user interface of the mobile computing device.

DETAILED DESCRIPTION

The subject matter disclosed herein relates to techniques for mobile computing device projection of a virtual image onto a physical surface. The physical surface, a wall for example, is associated with a plane. The virtual image is projected onto the plane of the physical surface. In aspects, the virtual image may be associated with a virtual plane and the projection may place the virtual image at the plane of the physical surface such that the virtual plane and the physical plane coincide. For example, the virtual image may be a virtual poster attached to a physical wall of a building. In this scenario, the virtual poster is rendered at a graphical user interface (GUI) of the mobile computing device. As a user holding the mobile computing device moves over the plane of the physical surface, some or all portions of the virtual image are rendered at the GUI. In aspects, a user moving through an augmented reality environment may see virtual posters disposed on surfaces, such as a wall, of the augmented reality environment.

Projecting a virtual image, as referred to herein, includes virtually attaching a virtual image to a plane of a physical surface generating a fixed physical location of the virtual image on the physical surface in an augmented reality environment. In a physical attachment, an image may be disposed on a physical poster hung on a physical wall. In a virtual attachment scenario achieved by virtual image projection techniques described herein, a virtual image simulates a physical poster attached to the physical wall in the GUI of the mobile computing device. Embodiments of the techniques described herein are discussed in more detail below.

Figure 1:
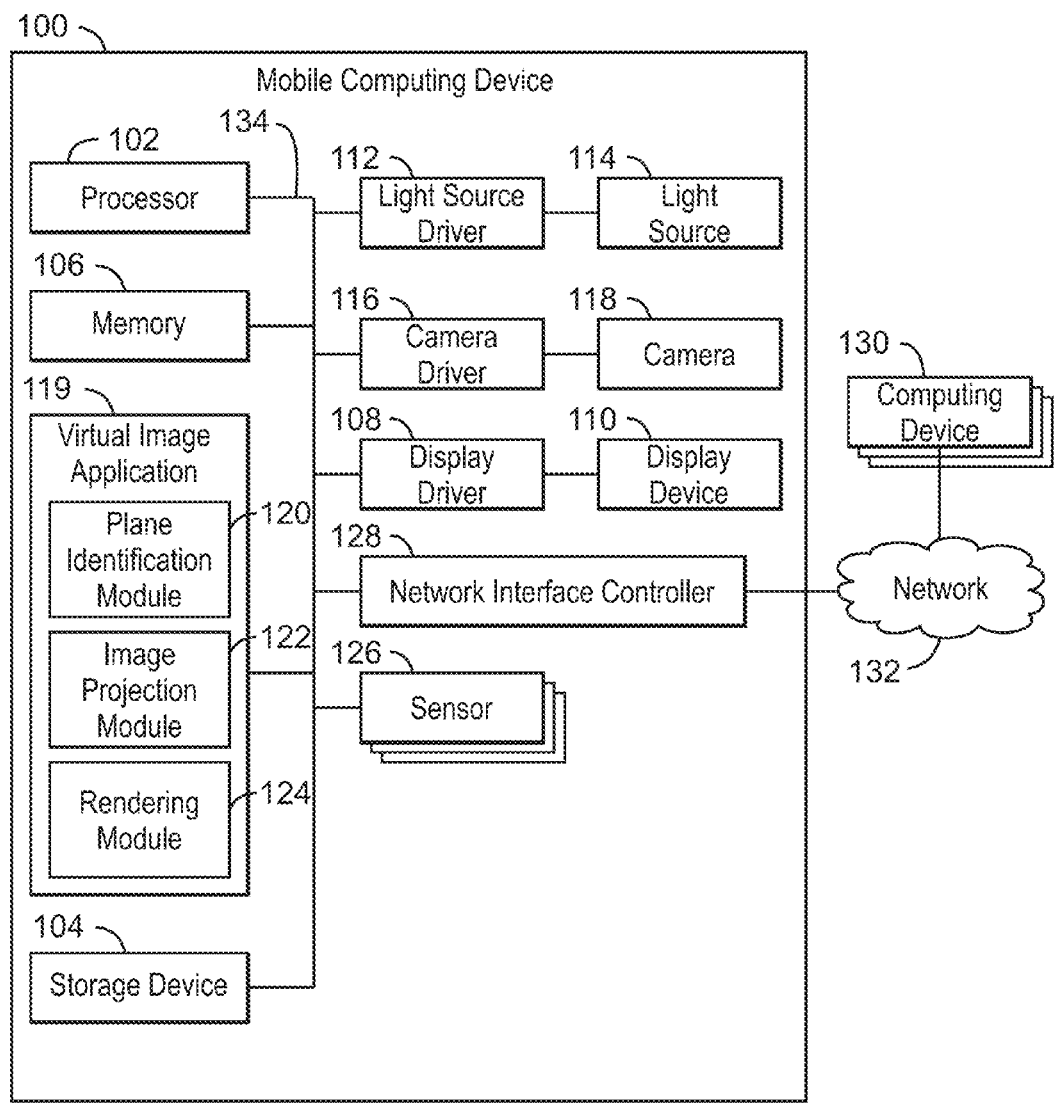
FIG. 1 is a block diagram of a mobile computing device having virtual image projection application to attach a virtual image to a physical surface.

FIG. 1 is a block diagram of a mobile computing device having virtual image projection application to attach a virtual image to a physical surface. The mobile computing device 100 may include a processor 102, a storage device 104 including a non-transitory computer-readable medium, and a memory device 106. The mobile computing device 100 may include a display driver 108 configured to operate a display device 110 to render images at a graphical user interface (GUI), light source driver 112 configured to operate a light source 114, and a camera driver 116 configured to operate a camera device 118.

The mobile computing device 100 includes modules of a virtual image application 119 configured to generate virtual images rendered in an augmented reality environment. As illustrated in FIG. 1, the modules include a plane identification module 120, an image projection module 122, and a rendering module 124. The modules 120, 122, and 124 may be logic, at least partially comprising hardware logic. In some examples, the modules 120, 122, 124 may be instructions stored on a storage medium configured to be carried out by a processing device, such as the processor 102. In yet other examples, the modules 120, 122, 124 may be a combination of hardware, software, and firmware. The modules 120, 122, 124 may be configured to operate independently, in parallel, distributed, or as a part of a broader process. In any case, the modules 120, 122, 124 are configured to carry out operations. The plane identification module 120 may identify a plane of a physical surface. For example, the plane identification module 120 may gather data related to a location having a plane, such as a wall, wherein a virtual image is to be projected. In some scenarios, the plane identification module 120 may gather data via a geo-location sensing device such as a GPS, and may, via the camera device 118 capture an image of the wall.

The image projection module 122 may project a plane of a virtual image onto the plane of the physical surface. For example, once the plane of a wall is identified by the plane identification module 120, a plane of a virtual image, such as a plane associated with a piece of paper that is to be virtually hung on the wall is projected onto the wall. The rendering module 124 may then render the virtual image at a GUI of the mobile computing device 100 via the display device 110. In this way, virtual images are hung, or placed, on physical surfaces.

In some scenarios, the modules 120, 122, 124 may be a set of instructions stored on the storage device 104, that when executed by the processor 102, direct the mobile computing device 100 to perform operations. The modules 120, 122, 124 may, in some scenarios, be implemented in logic, at least partially including hardware logic, such as electronic circuits, to carry out the operations discussed herein. The modules 120, 122, 124 may be considered separate modules or sub-modules of a parent module. Additional modules may also be included. For example, the mobile computing device 100 may include an angular detection module (not shown) configured to determine whether the mobile computing device is tilted in relation to an identified physical surface. As another example, the mobile computing device 100 may include a movement module (not shown) to generate virtual movement of the a virtual image based on physical movement of the mobile computing device 100 based on data gathered from one or more sensors configured to detect movement. In some scenarios, a movement module may be configured to generate virtual movement of the virtual image based on physical movement of a user within the virtual environment. For example, a user may wave their hand in front of the camera in the physical environment causing a virtually projected poster to flip over. Further examples are discussed in more detail below.

The virtual image may be rendered in various modes, such as a surface mode, a window mode, or any combination of the surface mode and window mode. As discussed in more detail below, the surface mode may enable a user to slide mobile computing device 100 on a physical surface to expose various parts of the projected virtual image. A window mode may render a virtual image while the user moves through an augmented reality environment within which the virtual image is projected onto a given surface. In either mode, virtual movement of the virtual image is generated based on physical movement of the mobile computing device 100. In embodiments, the mobile computing device 100 may include sensors 126. The sensors 126 may provide various types of data to the virtual image projection application 119. For example, the sensors 126 may include gyrometers, magnetometers, ambient sensors, geo-location sensors, and the like. In embodiments, one or more sensors 126 are configured to gather movement data indicating a transition from one mode to another, as discussed in more detail below in regard to FIG. 6.

The mobile computing device 100 may include a network interface controller 128 component configured to connect the mobile computing device 100 to remote computing devices 130 via a network 132. In some scenarios, the network interface controller 128 is an expansion card configured to be communicatively coupled to a system bus 134. In other scenarios, the network interface controller 128 may be integrated with a motherboard of a computing device, such as the mobile computing device 100. In embodiments, the physical surface identified by the plane identification module 120 may be based, at least in part, by data provided by a remote computing device, such as one of the remote computing devices 130. For example, geo-location data captured by one or more of the sensors 126 can be sent to remote computing devices 130, such as servers having virtual images preselected for a given location. The virtual image to be projected onto the plane of the physical surface may be provided to the mobile computing device 100 from one or more of the remote computing devices 130 via the network 132.

In embodiments, identification of the physical surface may be performed by receiving input from a user of the mobile computing device 100. For example, the user may download a magazine and intent to read the magazine at a desk. In this scenario, the virtual image projection application 119 may provide options to the user to place a virtual image of the magazine on the plane of the desk. As discussed in more detail below in reference to FIG. 2, if the magazine's native dimensions are larger than the dimensions of the mobile computing device 100, the user may move the mobile computing device 100 over the surface of the desk to reveal different portions of the magazine's projected virtual image on the desk. In embodiments, the camera device 118 is configured to track reflections of light projected by the light source 114 on a physical surface such that movement of the mobile computing device 100 over the physical surface generates virtual movement of the projected virtual image.

The mobile computing device 100, as referred to herein, is a computing device wherein components such as a processing device, a storage device, and a display device are disposed within a single housing. For example, the mobile computing device 100 may be a tablet computer, a smartphone, a handheld videogame system, a cellular phone, an all-in-one slate computing device, or any other computing device having all-in-one functionality wherein the housing of the computing device houses the display was well as components such as storage components and processing components.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through the system bus 134 (e.g., Peripheral Component Interconnect (PCI), Industry Standard Architecture (ISA), PCI-Express, HyperTransport®, NuBus, etc.) to components including the memory 106 and the storage device 104.

The display interface 110 may be a point of interaction with software or hardware of the mobile computing device 100 and the display device 112. For example, the display interface may be a digital video interface (DVI), a high-definition multimedia interface (HDMI), and the like. The display may be a built-in display, or a peripheral display of the mobile computing device 100. In embodiments, the display 112 includes touch-screen functionality.

The camera driver 116 is configured to direct the camera device 118 to capture visual information related to the physical surface and/or the environment of the physical surface. The camera device 118 may be a video camera configured to capture real-time video of the physical surface and the environment of the physical surface. In some embodiments, more than one camera device 118 may be included in the mobile computing device 100. In some aspects, the mobile computing device 100 includes a depth sensing camera, either as an additional component or as an integrated function of the camera device 118, configured to determine a distance between the mobile computing device and a physical surface, as discussed in more detail below.

The light source driver 112 is configured to direct the light source 114, such as light emitting diode, to turn on and turn off in response to operations of the virtual image projection application 119, as discussed in more detail below in regard to FIG. 9. For example, the light source 114 may be turned on in order to project light onto the physical surface, wherein the shape of the projected light indicates the orientation of the mobile computing device 100 in relation to the physical surface. As another example, the light source 114 may be used to track movements of the mobile computing device 100 over a physical surface.

The block diagram of FIG. 1 is not intended to indicate that the mobile computing device 100 is to include all of the components shown in FIG. 1. Further, the mobile computing device 100 may include any number of additional components not shown in FIG. 1, depending on the details of the specific implementation.

Figure 2:
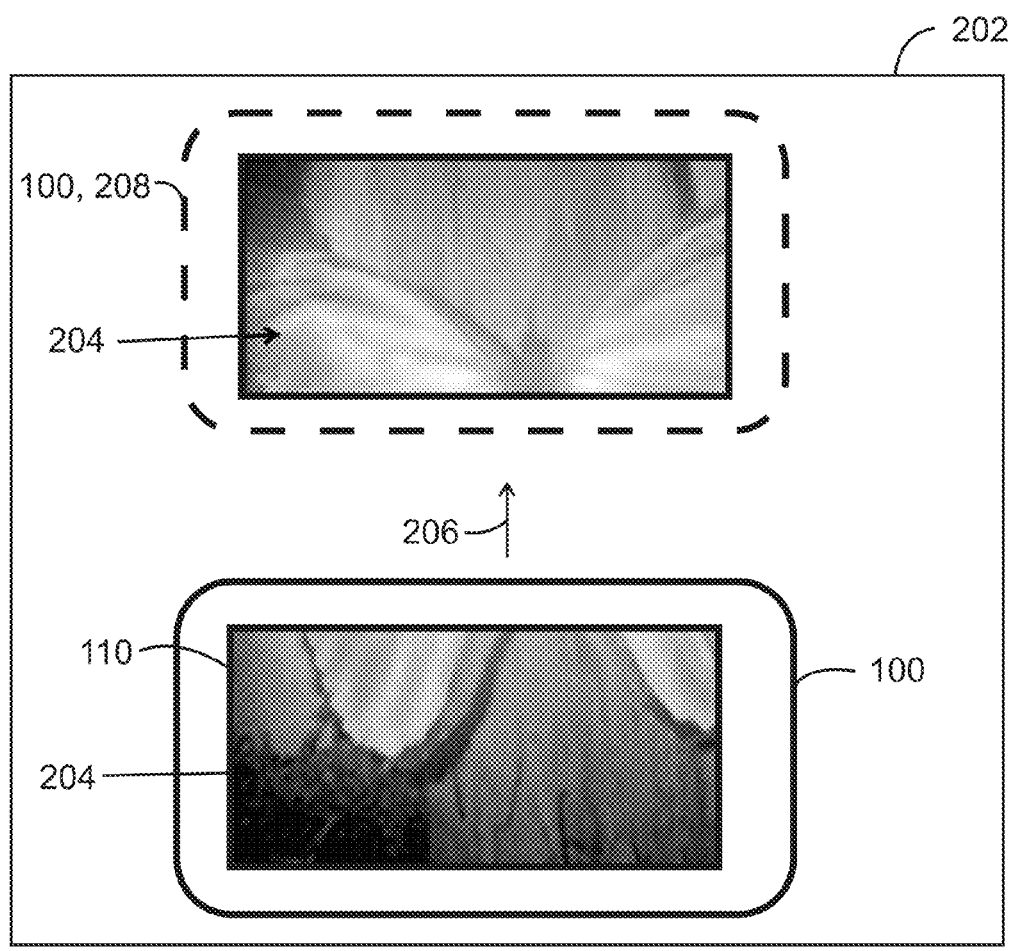
FIG. 2 is diagram illustrating the mobile computing device projecting the virtual image onto the physical surface.

FIG. 2 is diagram illustrating the mobile computing device projecting the virtual image onto the physical surface. The physical surface 202 may be any physical surface having a plane. For example, the physical surface 202 may be a surface of a desk, a wall, a floor, or any other physical surface having a plane associated with the physical surface. A mobile computing device, such as the mobile computing device 100 of FIG. 1, may be placed on the physical surface 202. A virtual image 204 is projected upon the physical surface 202.

As discussed above in regard to FIG. 1, a virtual image may have dimensions that are larger than the mobile computing device 100. In this scenario, a portion of a virtual image 204 may be rendered at the display device 110 of the mobile computing device 100. As the mobile computing device 100 moves over the physical surface 202, as indicated at 206, other portions of the virtual image 204 may be rendered at the display device 110, as indicated in the dashed box 208 illustrating the mobile computing device 100 in a new disposition on the physical surface 202. In embodiments, the techniques described herein enable the mobile computing device 100 to be used to explore the virtual image 204 by movement of the mobile computing device 100 over the physical surface 202. Movement of the mobile computing device 100 over the physical surface 202 may expose different portions of the virtual image 204.

In embodiments, the virtual image 204 is affixed to the physical surface, or to the plane associated to the physical surface 202. Affixing the virtual image 204 to the plane of the physical surface 202 simulates a physical posters or other material affixed to a physical surface.

In embodiments, the movement indicated by the arrow 206 may occur in a plane parallel to, or coinciding with, the plane of the physical surface 202 due to the mobile computing device 100 being substantially parallel to the physical surface 202. In this scenario, operations of the virtual image projection application 119 when the mobile computing device 100 is substantially parallel to the plane of the physical surface 202 may be referred to herein as "surface mode." As discussed in more detail below, the virtual image projection application 119 may have a second mode of operation, referred to herein as "window mode," wherein the mobile computing device is not parallel to the plane of the physical surface 202.

As discussed above in reference to FIG. 1, a light source, such as the light source 114 of FIG. 1, may be used project light onto the physical surface 202, and a camera device, such as the camera device 118, may capture variations of light reflected from the physical surface 202 indicating movement of the mobile computing device. In some scenarios, the camera device 118 may include a fish-eye lens configured to capture three dimensional data even when in the surface mode. In this scenario, the virtual image projection application 119 may implement feature tracking to determine movement of the mobile computing device 100 in an augmented reality environment, as discussed in more below in regard to FIG. 5 and FIG. 6.

Figure 3:
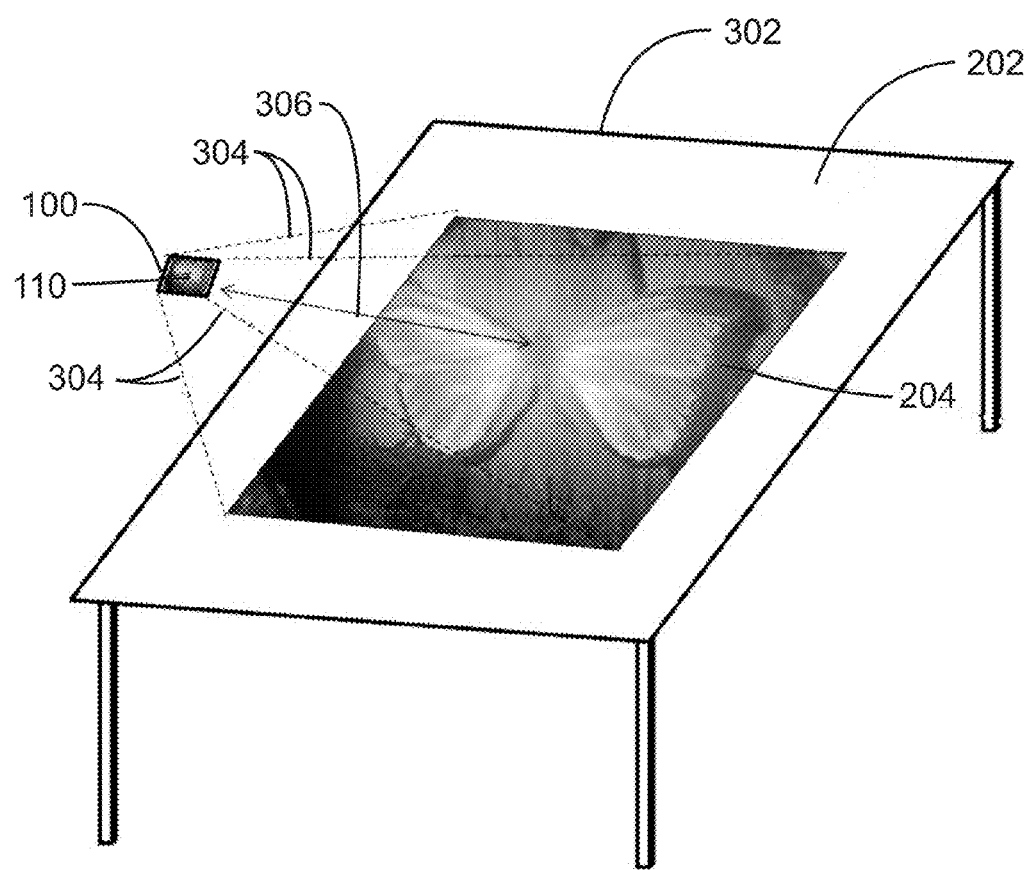
FIG. 3 is a diagram illustrating the mobile computing device projecting the virtual image onto the physical surface and increasing or decreasing a magnification of the virtual image based on movement of the mobile computing device.

FIG. 3 is a diagram illustrating the mobile computing device projecting the virtual image onto the physical surface and increasing or decreasing a magnification of the virtual image based on movement of the mobile computing device. In FIG. 3, the physical surface 202 is a surface of a table 302. The virtual image 204 is projected onto the physical surface 202 as indicated by the dashed lines 304, and rendered at the display device 110 of the mobile computing device 100.

In embodiments, the virtual image projection application 119 discussed above is configured to interpret movement data gathered from components of the mobile computing device 100, such as the one or more sensors 121, the camera device 118, and the like. For example, the one or more sensors 121 may include an inertial sensor of the computing device, such as a gyrometer, an accelerometer, a magnetometer, and the like. As another example, movement towards and away from the physical surface 202 may be captured by a depth sensing camera, as discussed above in regard to FIG. 1. In another example, the virtual image projection application 119 may derive local geometry using known references such as human head size, inter-ocular distance, and the like, to determine a distance as the mobile computing device 100 is disposed at various distances from the physical surface 202.

As illustrated in FIG. 3, movement away or towards the physical surface 302, as indicated by the arrow 306, may alter the magnification of the virtual image as rendered in the display of the mobile computing device 100. For example, movement of the mobile computing device 100 in a direction away from the physical surface 202 may decrease the magnification of the virtual image within the display of the mobile computing device 100. In another example, movement of the mobile computing device 100 in a direction towards the physical surface 202 increases the magnification of the virtual image within the display. The decrease or increase of magnification may be referred to as a "zoom out" or "zoom in" function respectively.

Figure 4:
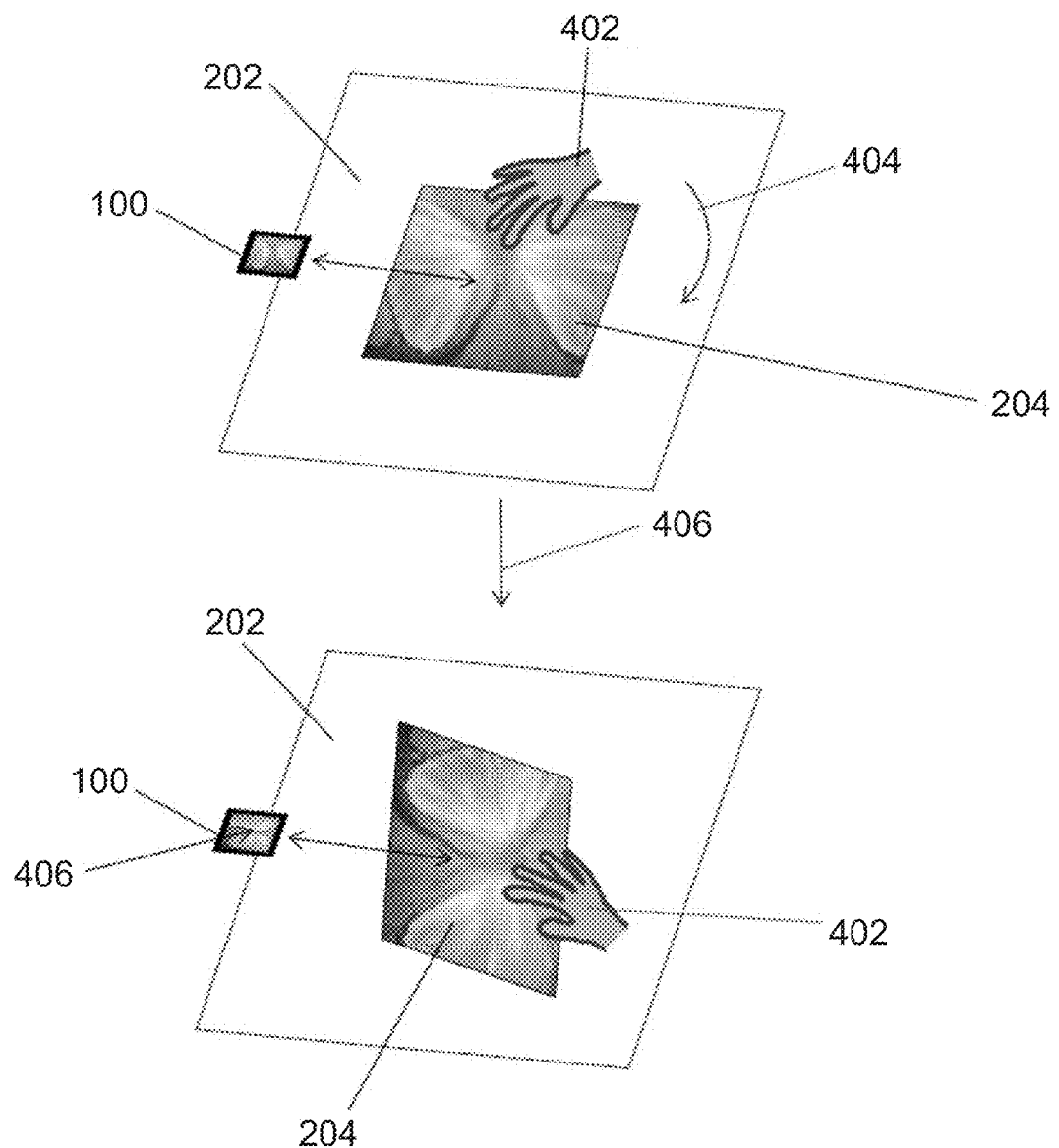
FIG. 4 is a diagram illustrating the mobile computing device projecting a virtual image onto the physical surface and adjusting an orientation of the virtual image based on movement of a user within an augmented reality environment.

FIG. 4 is a diagram illustrating the mobile computing device projecting a virtual image onto the physical surface and adjusting an orientation of the virtual image based on movement of a user within an augmented reality environment. The virtual image projection application 119 discussed above in may enable a user to interact with an augmented reality environment. As illustrated in FIG. 4, a user's hand 402 may be used to rotate the virtual image 202, as indicated by the arrow 404. As a result, the virtual image 204 is virtually rotated and rendered at the display in the rotated position, as generally indicated by the arrow 406.

In embodiments, other interactions between the user and the augmented reality environment are contemplated. For example, the user may turn the virtual image over revealing a back side of the virtual image 204, the user may draw on the virtual image 204, or any other interaction wherein the user interacts with the virtual image 204 disposed on a plane of the physical surface 202.

Figure 5:
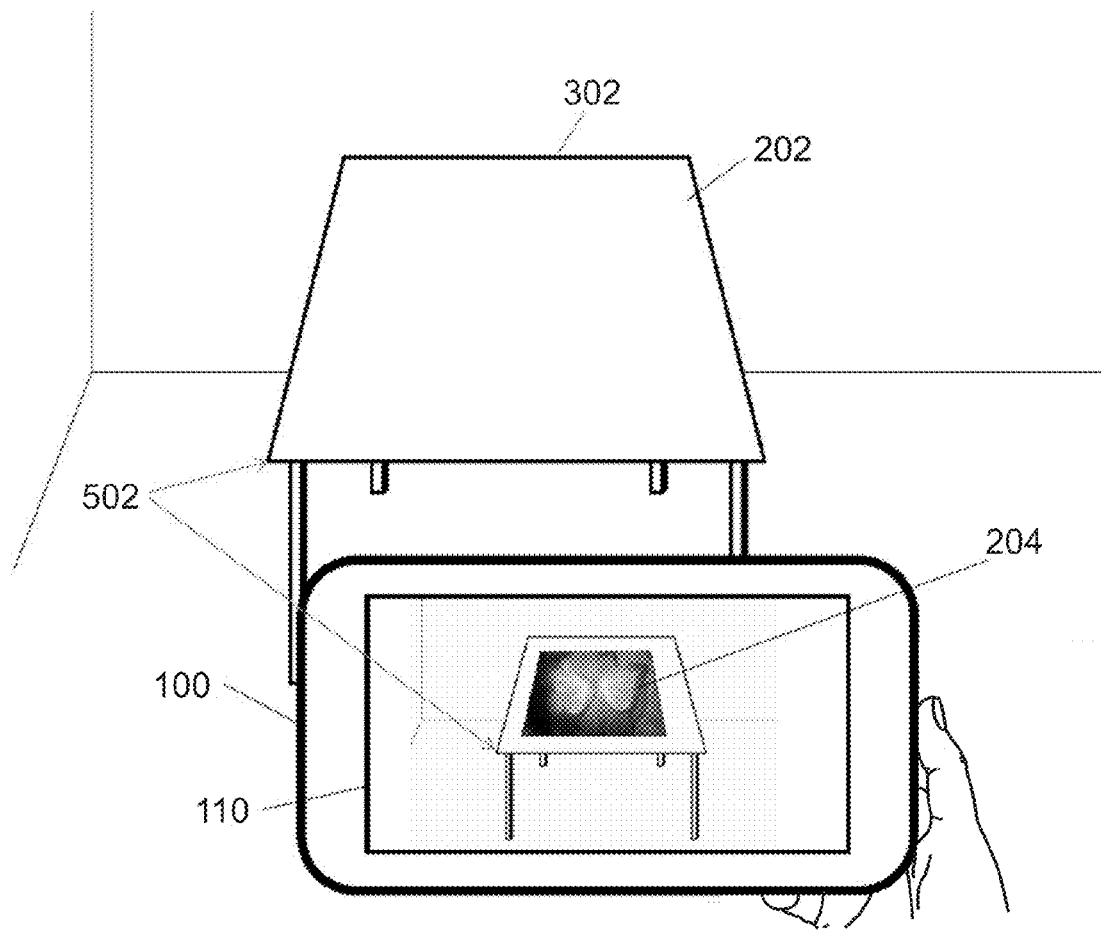
FIG. 5 is a diagram illustrating the mobile computing device projecting the virtual image onto the physical surface in a window mode.

FIG. 5 is a diagram illustrating the mobile computing device projecting the virtual image onto the physical surface in a window mode. As discussed above, the virtual image projection application 119 may operate in two modes: the surface mode discussed above in reference to FIG. 2 and illustrated in FIG. 3 and FIG. 4, and a window mode illustrated in FIG. 5. In window mode, the mobile computing device 100 renders a three dimensional view of the augmented reality environment 500. In some embodiments, the window mode is initiated upon detection of a non-parallel orientation of the mobile computing device 100 to the physical surface 202, discussed in more detail below in regard to FIG. 8 and FIG. 9.

In embodiments, the virtual image projection application 119 tracks features of the augmented reality environment 500, such as a corner 502 of the table 302. In this scenario, the virtual image projection application 119 tracks the position of the corner 502 to coherently place the virtual image 204 within the augmented reality environment 500 during movement of the mobile computing device 100. Other features may be tracked, such as a wall seam, a floor seam, or any other fixed feature within the augmented reality environment 500.

Figure 6:
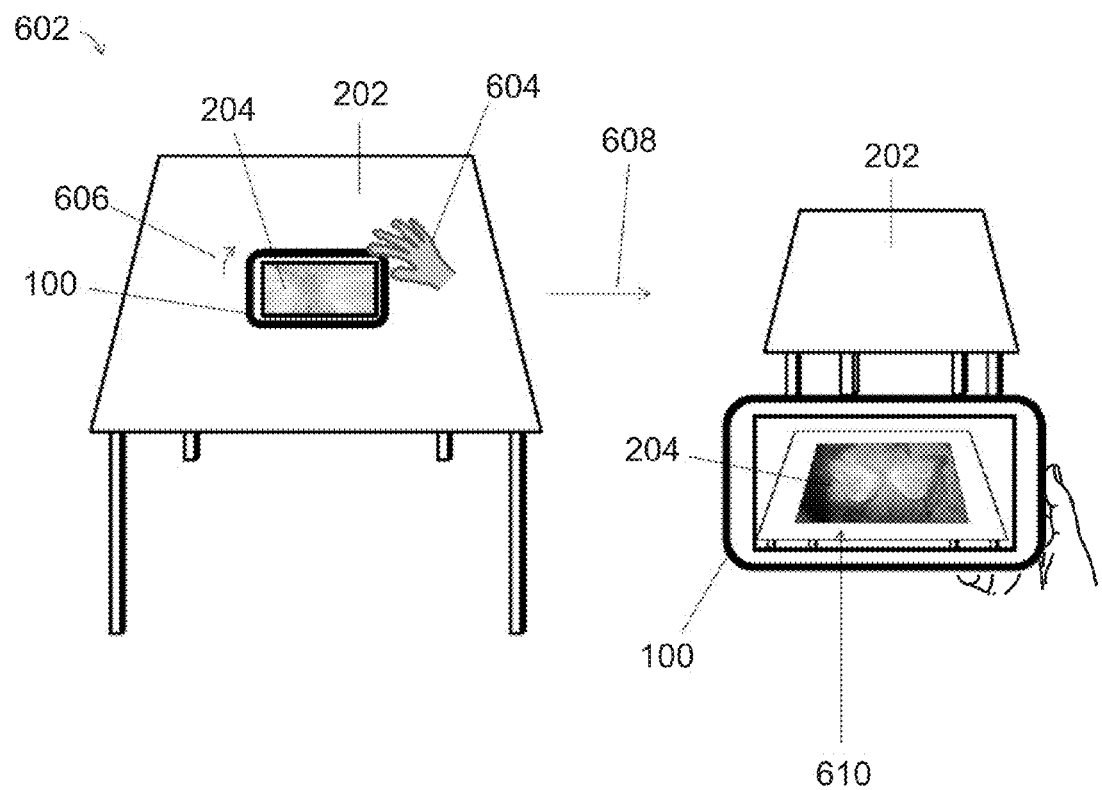
FIG. 6 is a diagram illustrating the mobile computing device transitioning from a surface mode to the window mode.

FIG. 6 is a diagram illustrating the mobile computing device transitioning from a surface mode to the window mode. A transition between modes may be rendered at the display 110 of the computing device 100. As indicated at 602, the mobile computing device 100 may render virtual image 204 in two dimensions during surface mode. In surface mode, the mobile computing device 100 is parallel to a plane of the physical surface 202. The mobile computing device may be tilted by a user 604. The tilting movement, indicated by the arrow 606, results in the mobile computing device 100 having an orientation that is not parallel to a plane of the physical surface 202. As a result, indicated by the arrow 608, the virtual image 204 will be rendered in the three dimensions of the augmented reality environment, as generally illustrated at 610.

As discussed above in reference to FIG. 5, feature tracking may be implemented by the virtual image projection application 119 such that transitions between surface mode and window mode, or transitions between window mode and surface mode, may be executed with reduced rendering errors. In some embodiments, the absence of a three dimensional feature may indicate that the mobile computing device 100 is being used in surface mode, and the presence of a three dimensional feature may indicate that the mobile computing device 100 is being used in a window mode. In some scenarios, a given frame of video capturing the augmented reality environment may be cached for a period of time to pre-empt renderings of the augmented reality environment. For example, a given frame may be cached for 1 second. If the mobile computing device 100 is moved during the 1 second period, the frame may be used as a reference to keep the virtual image fixed on the physical surface 202 during the movement.

Figure 7:
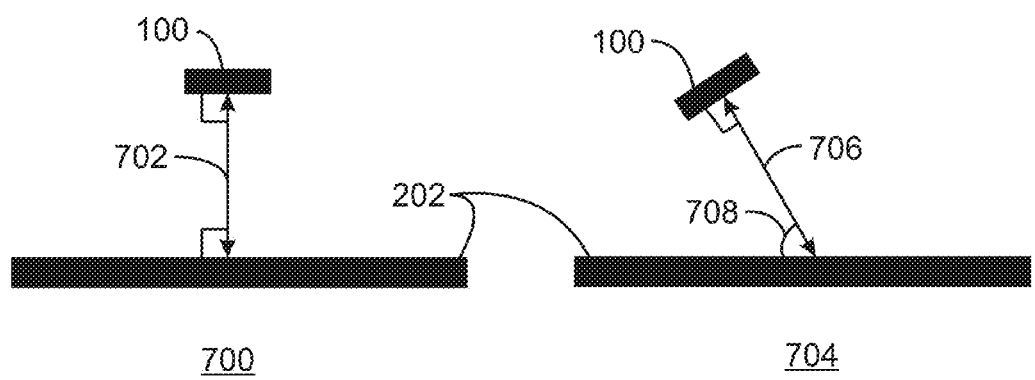
FIG. 7 is a diagram illustrating orientation of the mobile computing device to the physical surface in either the window mode or the surface mode.

FIG. 7 is a diagram illustrating orientation of the mobile computing device to the physical surface in either the window mode or the surface mode. In surface mode, the mobile computing device 100 is parallel, or at least substantially parallel to a plane of the physical surface 202, as indicated at 700. In other words, in surface mode a vector 702 normal to the physical surface 202 is also normal to the mobile computing device 100. In window mode, indicated at 704, the angle of a vector 706 normal to the mobile computing device 100 is not normal to the physical surface 202. For example, in window mode, the angle 708 is less than 90 degrees. In window mode, the resulting augmented reality environment rendered at the mobile computing device 100 is likely to include 3 dimensions, as opposed to 2 dimensions that may be rendered in surface mode.

Figure 8:
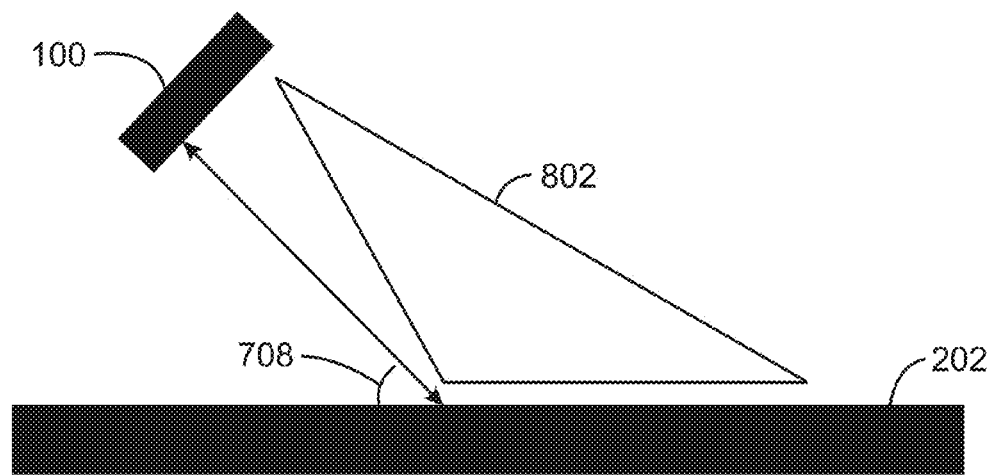
FIG. 8 is a side view diagram illustrating a light source projecting onto the physical surface to determine orientation of the mobile computing device with respect to the physical surface.

FIG. 8 is a side view diagram illustrating a light source projecting onto the physical surface to determine orientation of the mobile computing device with respect to the physical surface. To determine whether the mobile computing device 100 is in window mode or surface mode, techniques may be employed to render the augmented reality environment coherently based on orientation of the mobile computing device in relation to the physical surface 202. FIG. 8 illustrates that the mobile computing device 100 may illuminate the physical surface 202 using a light source, such as the light source 114 discussed above in regard to FIG. 1. The illumination, indicated at 802, may be cast upon the physical surface 202 to determine an angle, such as the angle 708 discussed above in reference to FIG. 7, indicating a degree of tilt of the mobile computing device 100 in relation to the physical surface 202.

Figure 9:
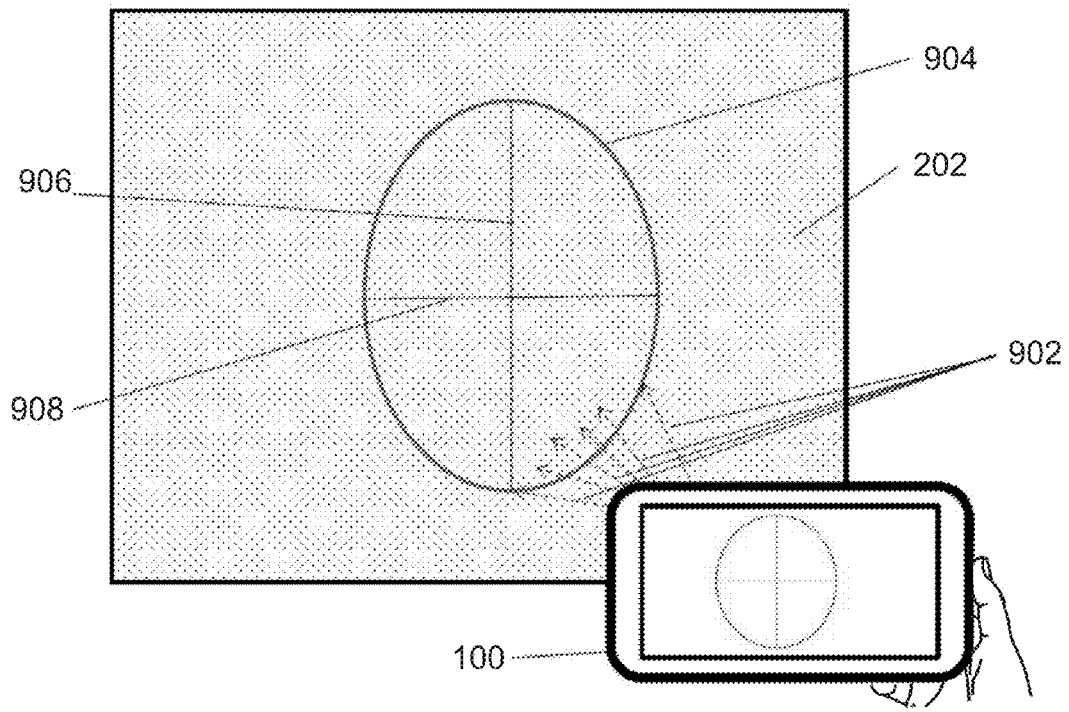
FIG. 9 is a diagram illustrating a light projected onto a surface such that the orientation of the mobile computing device with respect to the physical surface may be determined.

FIG. 9 is a diagram illustrating a light projected onto a surface such that the orientation of the mobile computing device with respect to the physical surface may be determined. The light projected onto the physical surface 202 is indicated by the dashed arrows 902. The projected light 902 results in an illumination, such as the illumination 802 discussed above in reference to FIG. 8, having a shape that may be used to determine the degree of tilt of the mobile computing device 100 in relation the physical surface 202. In other words, an angular relationship between the physical surface 202 and the mobile computing device 100 is determined by the shape of the light projected onto the physical surface 202.

In the scenario illustrated in FIG. 9, the shape is an ellipse 904 indicating that the mobile computing device 100 is being held at an angle, such as the angle 708 discussed above in reference to FIG. 7 and FIG. 8. The ellipse 904 has a major axis 906 and a minor axis 908. A comparison of the major axis 906 to the minor axis 908 indicates a degree of tilt. For example, when the major axis 906 is equal to the minor axis 908, the virtual image projection application 119 may determine that the mobile computing device 100 is being used in the surface mode. However, when the major axis 906 is greater than the minor axis 908, the virtual image projection application 119 may determine that the mobile computing device 100 is being used in the window mode.

Figure 10:
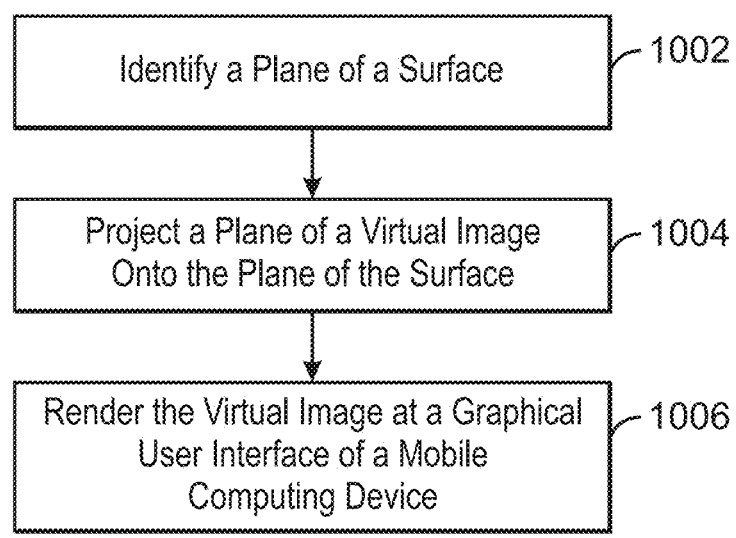
FIG. 10 is a block diagram illustrating a method for projecting a virtual image onto a physical surface.

FIG. 10 is a block diagram illustrating a method for projecting a virtual image onto a physical surface. A plane of a surface is identified at 1002. The plane may be identified using location-based techniques such as GPS, geo-fencing, and the like that may identify a surface having a virtual image attached to the physical surface. For example, an advertisement may be assigned to a physical wall. When the mobile computing device 100 is near by the physical wall, the method 1000 includes identifying the physical surface of the wall.

At 1004, a plane of a virtual image is projected onto the plane of the physical surface that was identified at 1002. In this manner, the virtual image is virtually pasted to the physical surface, similar to how a poster may be pasted to a wall in a non-augmented reality environment. In other words the plane of the virtual image may be adjacent to, or coincide with the plane of the physical surface.

At 1006, the virtual image is rendered at a graphical user interface of a mobile computing device. The virtual image is rendered in an augmented reality environment. As discussed above, the virtual image may be rendered in the surface mode, a window mode, in a transition from one mode to another, or any combination thereof. In surface mode, different portions of the virtual image may be exposed by movement of the mobile computing device over the physical surface.

In some scenarios, the method 1000 may include varying magnification based on movement of the mobile computing device towards and away from the physical surface. For example, the method 1000 may include increasing magnification of the virtual image as a result of movement of the mobile computing device towards the physical surface.

Figure 11:
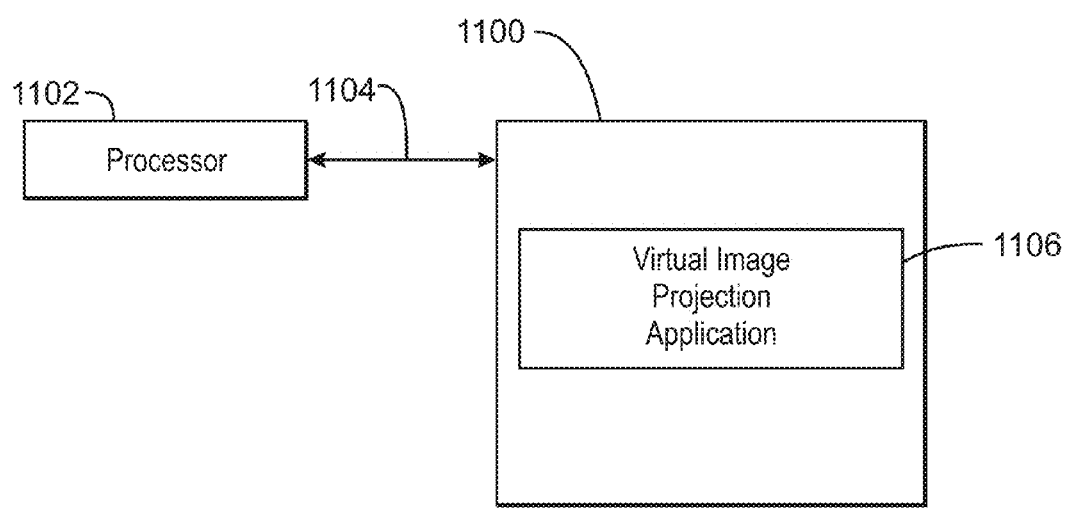
FIG. 11 is a block diagram depicting an example of a computer-readable medium configured to project a virtual image onto a physical surface.

FIG. 11 is a block diagram depicting an example of a computer-readable medium configured to project a virtual image onto a physical surface. The computer-readable medium 1100 may be accessed by a processor 1100 over a computer bus 1104. In some examples, the computer-readable medium 1100 may be a non-transitory computer-readable medium. In some examples, the computer-readable medium may be a storage medium, but not including carrier waves, signals, and the like. Furthermore, the computer-readable medium 1100 may include computer-executable instructions to direct the processor 1102 to perform the steps of the current method.

The various software components discussed herein may be stored on the tangible, non-transitory, computer-readable medium 1100, as indicated in FIG. 11. For example, a virtual image projection application 1106 may be configured to identify a plane of a physical surface, project a plane of a virtual image onto the plane of the physical surface, and render the virtual image at a graphical user interface of a mobile computing device.

Examples may include subject matter such as a method, means for performing acts of the method, at least one machine-readable medium including instructions that, when performed by a machine cause the machine to performs acts of the method, or of an apparatus or system for projecting a virtual image according to embodiments and examples described herein.

Example 1 is a method for virtual image projection including identifying a plane of a physical surface, projecting a virtual image onto the plane of the physical surface, and rendering the virtual image at a graphical user interface of a mobile computing device.

Example 2 includes the subject matter of Example 1, wherein when the computing device is smaller than the virtual image, the portions of the virtual image are rendered at the graphical user interface as the mobile computing device is moved over the plane of the physical surface.

Example 3 includes any combination of the subject matter of Examples 1-2, including an additional element wherein content of the virtual image is rendered as magnified as the mobile computing device is moved over the plane of the physical surface.

Example 4 includes any combination of the subject matter of Examples 1-3, further including rendering a surface mode wherein the virtual image is rendered as the mobile computing device is moved over the plane of the physical surface when the mobile computing device is parallel to the plane of the physical surface. Additionally or alternatively, the rendering of the virtual image may include rendering a window mode wherein the virtual image is rendered when the mobile computing device is not parallel to the plane of the physical surface.

Example 5 includes any combination of the subject matter of Examples 1-4, wherein the surface mode illustrates the virtual in two dimensions. Additionally or alternatively, the window mode may illustrate the virtual image having two dimensions in a three dimensional environment.

Example 6 includes any combination of the subject matter of Examples 1-5, further including transitioning between the surface mode and the window mode. Transitioning between modes may occur when the mobile computing device is moved from a disposition parallel to the plane of the physical surface to a disposition that is not parallel to the plane of the physical surface.

Example 7 includes any combination of the subject matter of Examples 1-6, further including projecting light from the mobile computing device to the physical surface. An angular relationship between the mobile computing device and the physical surface may be determined based on the shape of the light projected. The angular relationship may be used to determine whether the mobile computing device is parallel or non-parallel to the plane of the physical surface.

Example 8 includes any combination of the subject matter of Examples 1-7, further including generating virtual movement of the virtual image based on physical movement of the mobile computing device at the plane of the physical surface. For example, movement of the mobile computing device may generate movement of the virtual image that is rendered on the mobile computing device.

Example 9 includes any combination of the subject matter of Examples 1-8, further including increasing magnification of the virtual image generated by movement of the mobile computing device in a direction towards the physical surface. Alternatively or additionally, the subject matter may include decreasing magnification of the virtual image generated by movement of the mobile computing device in a direction away from the physical surface.

Example 10 includes any combination of the subject matter of Examples 1-9, further including generating virtual movement of the virtual image based on physical movement of a user within a virtual environment in which the virtual image is projected.

Example 11 is a system for projecting a virtual image. The system may include a processing device and modules to be implemented by the processing device. The modules may include a plane identification module to identify a plane of a physical surface. The modules may include an image projection module to project a plane of a virtual image onto the plane of the physical surface. The modules may also include a rendering module to render the virtual image at a graphical user interface of a mobile computing device.

Example 12 includes the subject matter of Example 11, wherein the computing device is smaller than the virtual image such that the rendering module renders only portions of the virtual image. As the mobile computing device is moved over the plane of the physical surface, additional portions are rendered.

Example 13 includes the subject matter of Example 12, further including magnifying the content of the virtual image as the as the mobile computing device is moved over the plane of the physical surface.

Example 14 includes any combination of the subject matter of Examples 11-13, wherein the rendering module is to further render a surface mode wherein the virtual image is rendered as the mobile computing device is moved over the plane of the physical surface when the mobile computing device is parallel to the plane of the physical surface. Alternatively or additionally, the rendering module is to a window mode wherein the virtual image is rendered when the mobile computing device is not parallel to the plane of the physical surface.

Example 15 includes any combination of the subject matter of Examples 11-14, wherein the rendering module, when rendering in surface mode, illustrates the virtual image in two dimensions. Additionally or alternatively, the rendering module, when rendering in window mode, illustrates the virtual image having two dimensions in a three dimensional environment.

Example 16 includes any combination of the subject matter of Examples 11-15; the rendering module is to further render transitions between the surface mode and the window mode. For example, when the mobile computing device is moved from a disposition parallel to the plane of the physical surface to a disposition that is not parallel to the plane of the physical surface, the rendering module may render the transition from the surface mode to the window mode.

Example 17 includes any combination of the subject matter of Examples 11-16, the system being implemented at least partially on the mobile computing device, wherein the mobile computing device further includes a light source. The system may further include an angular detection module to project light from the light source to the physical surface and determine an angular relationship between the mobile computing device and the physical surface based on the shape of the light projected. The angular detection module may determine whether the angular relationship indicates that the mobile computing device is parallel or non-parallel to the plane of the physical surface.

Example 18 includes any combination of the subject matter of Examples 11-17, further including a movement module to generate virtual movement of the virtual image based on physical movement of the mobile computing device at the plane of the physical surface.

Example 19 includes the subject matter of Example 18, as well as any combination of the subject matter of Examples 11-17, wherein the virtual movement that is generated by the movement module and rendered at the graphical user interface may include increasing magnification of the virtual image generated by movement of the mobile computing device in a direction towards the physical surface. Alternatively or additionally, the virtual movement generated may include decreasing magnification of the virtual image generated by movement of the mobile computing device in a direction away from the physical surface.

Example 20 includes the subject matter of any combination of Examples 11-19, further including a movement module to generate virtual movement of the virtual image based on physical movement of a user within a virtual environment in which the virtual image is being projected. For example, a user's hand may be captured by an image capturing device, such as a camera, and be used to manipulate the rendering of the virtual image at the graphical user interface, thereby providing an interactive virtual environment.

Example 21 includes a non-transitory computer-readable medium. In some scenarios, the computer-readable medium may include code, that when executed, cause a processing device to carry out the method discussed above in Examples 1-10 in any combination.

Example 22 includes an apparatus for projected a virtual image. The apparatus may include a processing device, and system memory. The system memory may be configured to store instructions executable by the processing device to initiate operations, the operations including identifying a plane of a physical surface, and projecting a plane of a virtual image onto the plane of the physical surface. The operations may further include rendering the virtual image at a graphical user interface of a mobile computing device.

Example 23 includes the apparatus of Example 22, wherein the apparatus is to carry out operations including the operations in any combination of the subject matter of Examples 1-10.

Example 24 is an apparatus for projecting a virtual image. The apparatus may include a means for identifying a plane of the physical surface, a means for projecting a plane of a virtual image onto the plane of the physical surface, and a means for rendering the virtual image at a graphical user interface. The means recited may include any of the devices and/or structures, such as the processing device and/or the modules discussed above in reference to Examples 11-20. Other means may be implemented as well.

In Example 25, the means for rendering in Example 24 is to render portions of the virtual image at the graphical user interface, rather than the entire virtual image when the mobile computing device is smaller in size than the dimensions of the virtual image.

Example 26 includes any combination of the subject matter of Examples 24-25, further including a means for rendering the virtual image as magnified as the mobile computing device is moved over the plane of the physical surface.

Example 27 includes any combination of the subject matter of Examples 24-26, further including rendering, via the rendering means, a surface mode wherein the virtual image is rendered as the mobile computing device is moved over the plane of the physical surface, and when the mobile computing device is parallel to the plane of the physical surface. Alternatively or additionally, the rendering means may render a window mode wherein the virtual image is rendered when the computing device is not parallel to the plane of the physical surface. For example, in window mode, the virtual image may be represented in a three-dimensional environment when in window mode, whereas the virtual image may be represented as a two dimensional document without the three dimensional environment during surface mode rendering.

Example 28 includes any combination of the subject matter of Examples 24-27, furthering including a means for transitioning between the surface mode and the window mode. The means for transitioning may be a stand-alone means, or a sub-means to the rendering means. In some examples, the means for transitioning may gather data indicating a shift in angular disposition of the mobile computing device in relationship to the physical surface. For example, when the mobile computing device is lifted off of a surface to a disposition that is not parallel to the surface, the transitioning means may indicate the transition and the means for rendering may render the transition from a two dimensional rendering of the surface to a three dimensional rendering of the surface in a three-dimensional environment.

Example 29 includes any combination of the subject matter of Examples 24-28, further including a light source, and a means for projecting light from the light source to the physical surface. The apparatus may further include a means for determining an angular relationship between the mobile computing device and the physical surface, and a means for determining whether the angular relationship indicates that the mobile computing device is parallel or non-parallel to the plane of the physical surface. The means discussed in Example 29 may be implemented by modules, such as the modules discussed above in Example 17.

Example 30 includes any combination of the subject matter of Examples 24-29, further including a means for generating virtual movement of the virtual image based on physical movement of the mobile computing device at the plane of the physical surface. The means discussed in Example 30 may be implemented by modules, such as the modules discussed above in Example 18.

Example 31 includes any combination of the subject matter of Examples 24-30, further including a means for increasing magnification of the virtual image generated by movement of the mobile computing device in a direction towards the physical surface. Alternatively or additionally, the apparatus may include a means for decreasing magnification of the virtual image generated by movement of the mobile computing device in a direction away from the physical surface. The means discussed in Example 31 may be implemented by modules, such as the modules discussed above in Example 19.

Example 32 includes any combination of the subject matter of Examples 24-31, further including a means for generating virtual movement of the virtual image based on physical movement of a user within a virtual environment in which the virtual image is projected. The means discussed in Example 32 may be implemented by modules, such as the modules discussed above in Example 20.

Example 33 is an apparatus including a means for implementing the method of any combination of Examples 1-10.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for projecting a virtual image, comprising:
   a light source to project light onto a physical surface;
   a processing device; and
   modules of code to be implemented by the processing device, the modules comprising:
      a plane identification module to identify a plane of the physical surface;
      an angular detection module to determine an angle indicating a degree of tilt of a mobile computing device relative to the physical surface based on a shape of the light projected onto the physical surface, wherein the angular detection module is to determine whether the angle indicating the degree of tilt indicates that the mobile computing device is parallel or non-parallel to the plane of the physical surface;
      an image projection module to project a plane of a virtual image onto the plane of the physical surface, wherein the extent of tilt of the plane of the virtual image relative to the physical surface is determined by the angle indicating the degree of tilt of the mobile computing device relative to the physical surface; and
      a rendering module to render the virtual image at a graphical user interface of the mobile computing device, wherein the virtual image is to transition between a surface mode and a window mode, wherein in the surface mode the virtual image is rendered as the mobile computing device is moved over the plane of the physical surface while parallel to the plane, and wherein in the window mode the virtual image is rendered if the mobile computing device is not parallel to the plane.

2. The system of claim 1, wherein the graphical user interface of the mobile computing device only displays a portion of the virtual image, and wherein the rendering module is to render portions of the virtual image at the graphical user interface as the mobile computing device is moved over the plane of the physical surface.

3. The system of claim 2, wherein content of the virtual image is rendered as magnified as the mobile computing device is moved over the plane of the physical surface.

4. The system of claim 1, wherein the surface mode illustrates the virtual image in two dimensions, and wherein the window mode illustrates the virtual image having two dimensions in a three dimensional environment.

5. The system of claim 1, further comprising a movement module to generate virtual movement of the virtual image based on physical movement of the mobile computing device at the plane of the physical surface.

6. The system of claim 5, the virtual movement comprising:
increasing magnification of the virtual image generated by movement of the mobile computing device in a direction towards the physical surface; or
decreasing magnification of the virtual image generated by movement of the mobile computing device in a direction away from the physical surface; or
any combination thereof.

7. The system of claim 1, further comprising a movement module to generate virtual movement of the virtual image based on physical movement of a user within a virtual environment in which the virtual image is projected.

8. A method for virtual image projection, comprising:
projecting light onto a physical surface;
identifying a plane of the physical surface;
determining an angle indicating a degree of tilt of a mobile computing device relative to the physical surface based on a shape of the light projected onto the physical surface;
determining whether the angle indicating the degree of tilt indicates that the mobile computing device is parallel or non-parallel to the plane of the physical surface;
projecting a virtual image onto the plane of the physical surface, wherein the extent of tilt of the virtual image relative to the physical surface is determined by the angle indicating the degree of tilt of the mobile computing device relative to the physical surface; and
rendering the virtual image at a graphical user interface of the mobile computing device, wherein the virtual image is to transition between a surface mode and a window mode, wherein in the surface mode the virtual image is rendered as the mobile computing device is moved over the plane of the physical surface while parallel to the plane, and wherein in the window mode the virtual image is rendered if the mobile computing device is not parallel to the plane.

9. The method of claim 8, wherein the graphical user interface of the mobile computing device only displays a portion of the virtual image, further comprising rendering portions of the virtual image at the graphical user interface as the mobile computing device is moved over the plane of the physical surface.

10. The method of claim 9, wherein content of the virtual image is rendered as magnified as the mobile computing device is moved over the plane of the physical surface.

11. The method of claim 8, wherein the surface mode illustrates the virtual image in two dimensions, and wherein the window mode illustrates the virtual image having two dimensions in a three dimensional environment.

12. A non-transitory computer readable medium including code, when executed, to cause a processing device to:
project light onto a physical surface;
identify a plane of the physical surface;
determine an angle indicating a degree of tilt of a mobile computing device relative to the physical surface based on a shape of the light projected onto the physical surface;
determine whether the angle indicating the degree of tilt indicates that the mobile computing device is parallel or non-parallel to the plane of the physical surface;
project a plane of a virtual image onto the plane of the physical surface, wherein the extent of tilt of the plane of the virtual image relative to the physical surface is determined by the angle indicating the degree of tilt of the mobile computing device relative to the physical surface; and
render the virtual image at a graphical user interface of the mobile computing device, wherein the virtual image is to transition between a surface mode and a window mode, wherein in the surface mode the virtual image is rendered as the mobile computing device is moved over the plane of the physical surface while parallel to the plane, and wherein in the window mode the virtual image is rendered if the mobile computing device is not parallel to the plane.

13. The non-transitory computer readable medium of claim 12, further comprising code to cause the processing device to render portions of the virtual image at the graphical user interface as the mobile computing device is moved over the plane of the physical surface, when the graphical user interface of the mobile computing device only displays a portion of the virtual image.

14. The non-transitory computer readable medium of claim 13, wherein content of the virtual image is rendered as magnified as the mobile computing device is moved over the plane of the physical surface.

15. The non-transitory computer readable medium of claim 12, wherein the surface mode illustrates the virtual image in two dimensions, and wherein the window mode illustrates the virtual image having two dimensions in a three dimensional environment.

16. The non-transitory computer readable medium of claim 12, further comprising code to cause the processing device to generate virtual movement of the virtual image based on physical movement of the mobile computing device at the plane of the physical surface.

17. The non-transitory computer readable medium of claim 16, the virtual movement comprising:
increasing magnification of the virtual image generated by movement of the mobile computing device in a direction towards the physical surface; or
decreasing magnification of the virtual image generated by movement of the mobile computing device in a direction away from the physical surface; or
any combination thereof.

18. The non-transitory computer readable medium of claim 12, further comprising code to cause the processing device to generate virtual movement of the virtual image based on physical movement of a user within a virtual environment in which the virtual image is projected.

* * * * *